United States Patent [19]
Birkle et al.

[11] Patent Number: 5,244,564
[45] Date of Patent: Sep. 14, 1993

[54] APPARATUS FOR ELECTROLYTIC SURFACE COATING OF POURABLE MATERIAL AND METHOD FOR OPERATING THE APPARATUS

[75] Inventors: Siegfried Birkle, Höchstadt/Aisch; Johann Gehring, Spardorf; Waldemar Nippe, Erlangen, all of Fed. Rep. of Germany

[73] Assignee: Siemens Aktiengesellschaft, Berlin & Munich, Fed. Rep. of Germany

[21] Appl. No.: 752,539
[22] PCT Filed: Feb. 21, 1990
[86] PCT No.: PCT/EP90/00292
§ 371 Date: Nov. 6, 1992
§ 102(e) Date: Nov. 6, 1991
[87] PCT Pub. No.: WO90/10736
PCT Pub. Date: Sep. 20, 1990

[30] Foreign Application Priority Data
Mar. 6, 1989 [DE] Fed. Rep. of Germany ....... 3907187

[51] Int. Cl.⁵ .................. C25D 5/18; C25D 17/28
[52] U.S. Cl. .................... 205/148; 204/201
[58] Field of Search ................ 205/148; 204/201

[56] References Cited
U.S. PATENT DOCUMENTS

| | | | |
|---|---|---|---|
| 3,649,490 | 3/1972 | Nolan et al. | 204/146 |
| 4,670,120 | 6/1987 | Birkle et al. | 204/201 |
| 4,701,248 | 10/1987 | Birkle et al. | 204/201 |
| 4,969,985 | 11/1990 | Birkle | 204/201 |

Primary Examiner—T. M. Tufariello
Attorney, Agent, or Firm—Kenyon & Kenyon

[57] ABSTRACT

The bulk material is transportable in an electrolyte in the conveying trough of a vibrator conveyor. The perforated conveying trough constitutes one of the two electrodes. According to the invention, the polarity of the conveying trough (21) and of the other electrodes (36 to 39) is reversible. The conveying trough (21) and the other electrodes (36 to 39) may be fastened preferably on common supporting stringpieces (22 to 27), which serve at the same time as power lead for one of the two electrodes and are connected with the central pipe (2). With this design the life of the other electrodes (36 to 39) is lengthened.

3 Claims, 2 Drawing Sheets

APPARATUS FOR ELECTROLYTIC SURFACE COATING OF POURABLE MATERIAL AND METHOD FOR OPERATING THE APPARATUS

BACKGROUND OF THE INVENTION

The invention relates to an apparatus for electrolytic surface coating of pourable material, preferably for electrodeposition of metal, in particular aluminum, from an electrolyte. The pourable material is transported in the conveying trough of a vibrator conveyor at least partially in the treatment bath of the electrolyte. The conveying trough forms the two electrodes.

Such an apparatus is known from EP-A 0 209 766.

It is known that by surface improvement of metal parts their life can be lengthened and new areas of use can be opened up. For example, the coating of light metal and ferrous materials may be appropriate, as they generally involve relatively base metals, whose surfaces may corrode under atmospheric action. Suitable pretreatment gives the parts a polished surface without cover layer. The metallic coating can be supplemented with an aftertreatment.

During the electrodeposition, the pourable small parts must be held together so that each individual part has electric contact. On the other hand, the bulk material to be treated should be spread out to the extent that the metal deposition can occur on a product surface as large as possible and that on all parts a current density as uniform as possible is ensured. Another essential prerequisite for satisfactory metal coatings with a uniform layer thickness is sufficient mixing of the material during the electrodeposition. The apparatus for electrolytic surface coating is equipped with conveying means for the transport of the bulk material through the electrolyte which permit, in conjunction with respective inlet and outlet locks, either continuous or intermittent proportioned feeding and discharge of the material. In addition, the movement through the electrolyte and the thorough mixing of the material as well as the transport through the electrolyte must be carried out in such a way that gentle treatment of the material is ensured and even delicate parts are not mechanically damaged during the electrodeposition.

For mass electrodeposition, in particular for electrodeposition of aluminum, a known apparatus is suitable in which a vibrator conveyor with a horizontal and a vertical vibration component is provided for transporting the pourable material. This vibrator conveyor transports the pourable material, utilizing the forces of gravity, in a spiral conveying trough in ascending direction about a central pipe connected with the conveying trough. The vibrator conveyor is lodged with the central pipe in a gasproof vessel containing an electrolyte into which the vibrator conveyor dips partially. As drive means are used for example oblique-action vibrators or obliquely set rods. Such vibrator conveyors require relatively little drive force and permit gentle conveyance of the pourable material. One obtains intensive product movement and good electrolyte exchange as well as a uniform current consumption over the total effective surface of the spread-out material (DE-OS 35 24 510).

Since during coating the material is removed from the anodes and deposited on the bulk material, the anodes must, as is known, be replaced after a predetermined number of hours of operation. Further it is desired to obtain a high material utilization of the anodes, and in addition the availability of the installation is to be maintained by reducing the down times for changing the anodes.

For electrolytic surface coating of pourable material, in particular for electrodeposition of aluminum in a vibrator conveyor system, the anodes may be disposed, accessible from the outside, on the inner wall of the vessel or on a so-called anode shaft cover. As the anodes are being used up by the coating process, their life is limited to a predetermined number of hours of operation. For this reason they are replaced when about 60 to 70% of their material is used up. This is necessary because otherwise the anodes may, in case of irregular erosion, corrode through and the remaining stumps may warp due to their dead weight and thus make a shortcircuit to the cathode. For anode change the installation filled with electrolyte at about 100° C. must be cooled, emptied, flushed with toluene, and dried. The electric leads of the anodes are disconnected, the anodes exchanged through openings in the vessel wall, and for restarting the apparatus these operations take place in reverse order.

SUMMARY OF THE INVENTION

It is therefore the object of the invention to indicate, for an apparatus for electrolytic surface coating of bulk material in a vibrator conveyor system, design characteristics which make possible an especially simple mounting and simple changing of the metal anodes. In particular the life of the anodes is to be lengthened considerably.

According to the invention, this problem is solved with the characterizing feature of claim 1. In this form of realization of the apparatus for surface coating it is possible, after a predetermined number of hours of operation, to supply to the cathode bulk material of the material to be deposited, in particular aluminum, as a granulate, and then to connect the conveying trough containing the granulate, for example during the night, and to deposit the granulated material on the anode again as a layer.

In a special form of realization of the apparatus, the two electrodes can be secured on joint supporting stringpieces, which serve at the same time as power lead for one of the two electrodes, for example for the conveying trough connected as cathode in normal operation. These supporting stringpieces are secured on the central pipe.

BRIEF DESCRIPTION OF THE DRAWINGS

For further elucidation of the invention reference is made to the drawing which illustrates schematically as a practical example an apparatus for electrodeposition of aluminum.

DETAILED DESCRIPTION OF THE INVENTION

Figure 1:
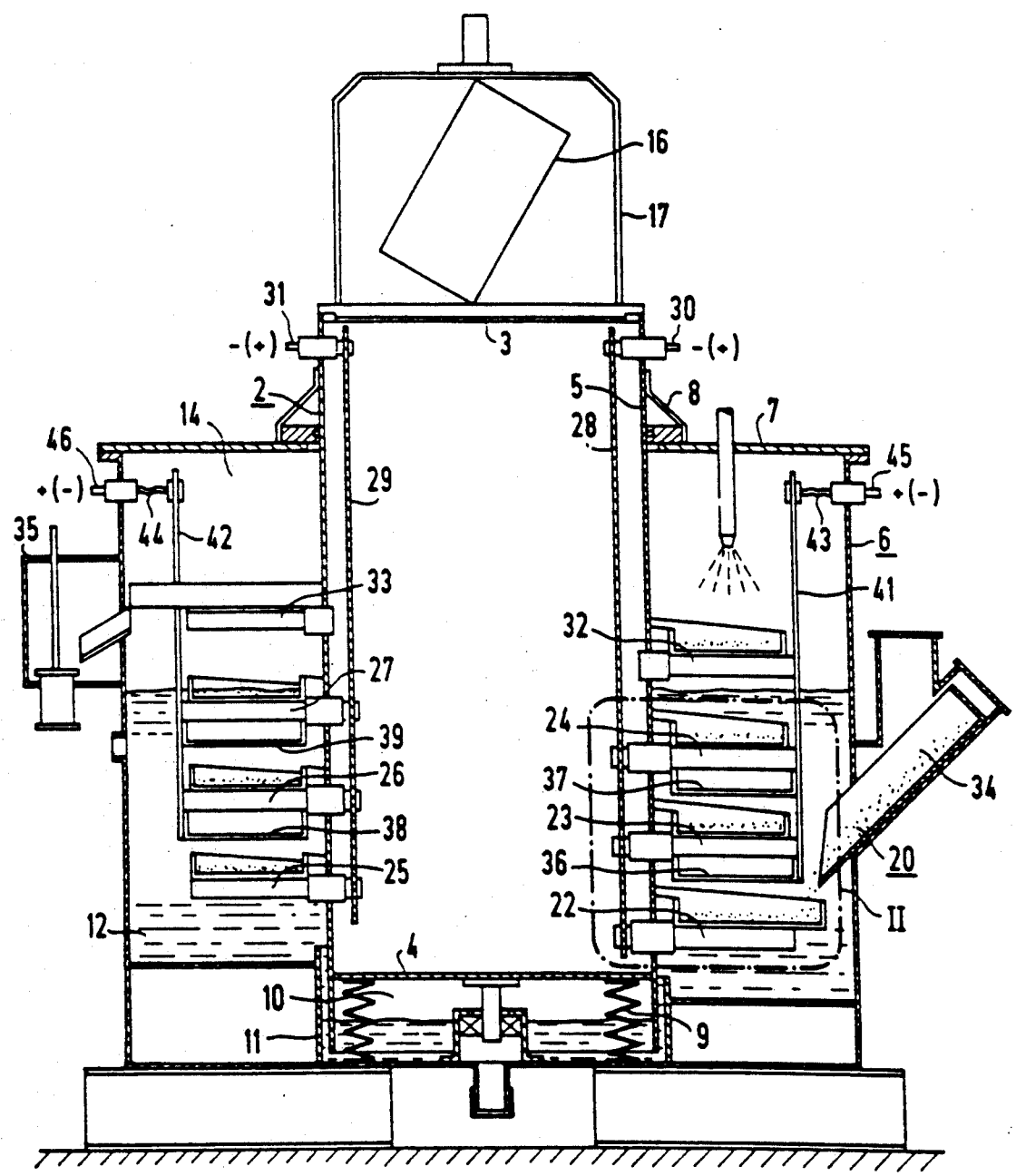
FIG. 1 shows a transverse section through the installation, and in FIG. 2 the design of the electrodes and their electric contacting is illustrated.

In the apparatus according to FIG. 1 for electrolytic surface coating of pourable material, preferably for the electrodeposition of metal, in particular aluminum, from an aprotic, oxygen- and water-free aluminum-organic electrolyte, a vibrator conveyor is provided for the transport of pourable material to be coated. The vibrator conveyor comprises a central pipe 2 with a bottom 4 and a sidewall 5. The central pipe 2 protrudes from a vessel 6, the cover 7 of which in the form of an annular disk is fastened on the sidewall 5 of the central pipe 2 through a flexible connection 8. The sidewall of the vessel 6 is connected with the bottom 4. The bottom 4 of the central pipe 2 rests, able to vibrate, on springs 9 and on a gas cushion 10 which in the manner of a diving bell is enclosed between the bottom 4 of the central pipe 2 and an annular-cylindrical extension 11 of the central pipe 2 as well as an electrolyte 12. The central pipe 2 is partly surrounded by the electrolyte 12. Above the electrolyte 12 a gas chamber 14 is formed, which may be filled preferably with nitrogen. The central pipe 2 is provided with a vibratory drive 16 which is disposed on a bearing block 17 above the cover 7 of the central pipe 2.

The drive 16 produces in conjunction with a mechanism not shown in the figure a vibratory motion of the central pipe 2 and hence of the bulk material 20 and hence of a conveying trough 21 which is arranged spirally around the central pipe 2 and is connected with the latter. The conveying trough 21 is provided with stringpieces 22 to 27 which are arranged at predetermined intervals around the central pipe 2. They are led through the sidewall 5 of the central pipe 2 by means of bushings (not specifically marked) and electrically insulated against this sidewall 5. These supporting stringpieces 22 to 27 serve both as mechanical mount for the conveying trough 21 and as power lead for the conveying trough 21, connected as cathode during normal operation, and hence also for the bulk material 20. The superposed supporting stringpieces 22 to 24 and 25 to 27 are electroconductively connected in each instance by means of a contact bar 28, 29 to an electrode terminal 30, 31, respectively, which according to the invention can be poled both as cathode and as anode. Two additional stringpieces 32 and 33, located above the electrolyte 12, serve only for attaching the conveying trough 21. For supplying the bulk material a feed lock 34, and for removal of the bulk material, a discharge lock 35 are provided.

Between the spirals of the conveying trough additional electrodes are provided, which in the figure are marked 36 to 39 and which in normal operation of the apparatus, when the bulk material 20 is to be provided with a surface coating, are connected as anodes. The electrodes 36 and 37 are connected via a contact bar 41 as well as a flexible connecting conductor 43 to an electrode terminal 45, which is connected to a voltage source, not shown in the figure, with reversible polarity. In the same manner the electrodes 28 and 39 are connected via a contact bar 42 as well as a flexible connecting conductor 44 to an electrode terminal 46, which too is connected to a supply voltage not shown in the figure with reversible polarity. In this form of realization of the apparatus it is possible, after the coating of the bulk material 20, to empty the installation and to fill the conveying trough 21 with a granulate of the material to be deposited. Then the polarity of the electrode terminals 30 and 31 as well as 45 and 46 is reversed. Thereby the granulate transported inside trough 21 is connected as anode and the electrodes 36 to 39 are connected as cathode. Thus there occurs, for example during the night or on Sundays and holidays, a coating and hence a regeneration of the electrodes 36 to 39, which may preferably consist of laminar segments and are arranged side by side and with at least approximately the inclination of the conveying trough 21 in such a way that they follow the form of trough 21. During this time, the possibly entire material removed from the anodes during the coating of the bulk material 20 can accrete again.

Figure 2:
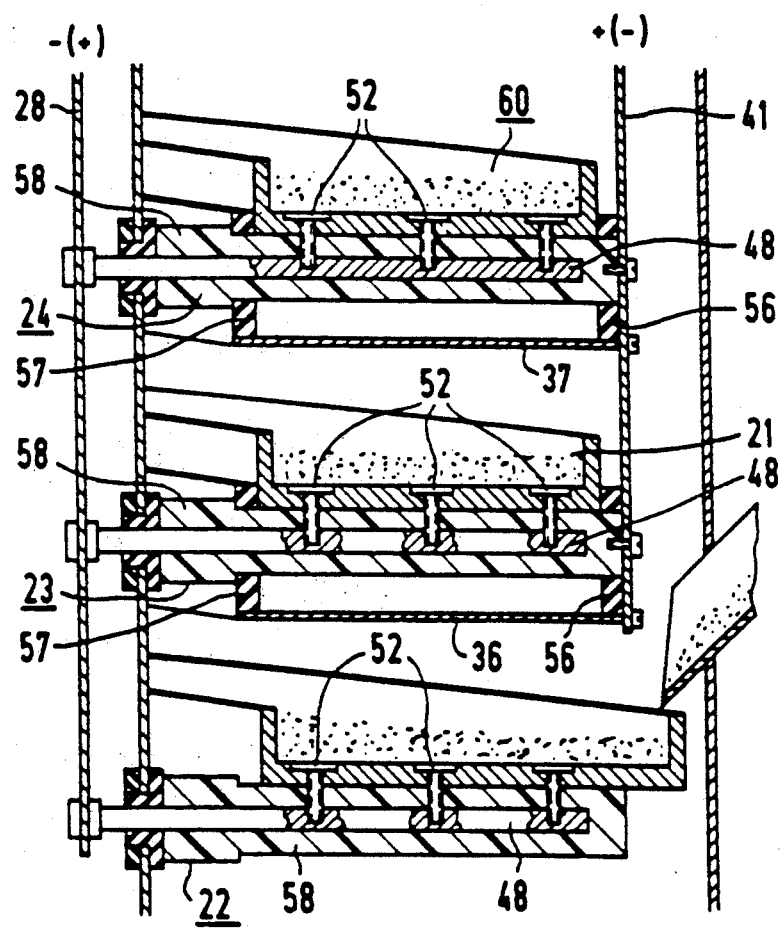

In the form of realization according to FIG. 2, only a part of FIG. 1 is shown with the supporting stringpieces 22 to 24, which are fastened on the central pipe 2 and electroconductively connected with their contact bar 28. The conveying trough 21 is screwed to each of the supporting stringpieces 22 to 24 with a steel shaft 48. For this purpose screws 52 are used which are made of electrically conducting material and which may be provided in particular with enlarged heads. These screws, for example six for each of the supporting stringpieces, of which only three are indicated in the figure for simplification, serve both for the mechanical attachment of the conveying trough 21 on the stringpieces 22 to 24 and for power transmission from the contact bar 28 to trough 21. The stringpieces 22 to 24 are electrically insulated against the central pipe 2. The details of the attachment are not shown in the figure for simplification. The steel shaft 48 is surrounded by a sheath 58 which may consist of electrically insulating material, preferably laminated cloth. The electrodes 36 and 37 are each attached to the supporting stringpieces 23, 24 by means of straps 56 and 57 of electrically insulating material. Through a screw union not specifically marked, which serves both for attachment and for electrical contacting, these electrodes 36 and 37 are connected to the contact bar 41, which is electrically insulated from the conveying trough 21 and from the steel shaft 48.

For the regeneration of the electrodes 36 and 37, the conveying trough 21 is emptied of the bulk material after the coating, and a granulate 60 of the material of the electrodes 36 and 37 is supplied. Then the polarity of the power feeds is reversed and the conveying trough 21 and hence also the granulate 60 is connected as anode and the electrodes 36 and 37 as cathode. With this polarity the material of the granulate is removed and deposited on the surfaces of the electrodes 36 and 37. With a thickness of the electrodes 36 and 37, connected as anodes in normal operation, of for example about 10 to 20 mm, preferably about 12 to 15 mm, the regeneration can be carried out when the material of the electrodes 36 and 37 has been removed down to a thickness of for example about 5 to 8 mm. By this repeated regeneration the life of the anodes can thus be substantially lengthened, possibly almost ad libitum.

What is claimed is:

1. In a method for operating an apparatus for electrolytic surface coating of pourable material from an electrolyte, the apparatus including a vibrator conveyor having a perforated conveying trough, the trough being arranged spirally around a central pipe and serving as one of two sets of electrodes and being partially surrounded by electrolyte contained in a gasproof vessel, the improvement comprising the step of reversing polarity of the two sets electrodes whereby the set of electrodes connected as anodes are selectively decomposed electrolytically so as to deposit material or a material of the anodes is supplied to the conveying trough as granulate and is deposited on the anodes connected as cathode.

2. The method according to claim 1 wherein current is supplied to the conveying trough via supporting stringpieces thereof.

3. An apparatus for electrolytic surface coating of pourable material from an electrolyte, comprising: a vibrator conveyor having a perforated conveying trough disposed spirally around a central pipe, the trough serving as one of two electrodes and being partially surrounded by electrolyte in a gasproof vessel, all electrodes being fastened on the central pipe; and supporting stringpieces, attaching of the conveying trough on the central pipe, the supporting stringpieces serving as a power lead for the conveying trough and each supporting stringpiece forming a structural unit with one of the anodes.

* * * * *